United States Patent
Tabellini (10) Patent No.: US 6,431,249 B1
(45) Date of Patent: Aug. 13, 2002

(54) DEVICE FOR DAMPING MOVEMENT OF TELESCOPIC GUARDS

(75) Inventor: Giorgio Tabellini, Sasso Marconi (IT)

(73) Assignee: P.E.I. Protezioni Elaborazioni Industriali S.r.l., Bologna (IT)

( * ) Notice: Subject to any disclaimer, the term of this patent is extended or adjusted under 35 U.S.C. 154(b) by 0 days.

(21) Appl. No.: 09/626,988

(22) Filed: Jul. 27, 2000

(30) Foreign Application Priority Data

Jul. 30, 1999 (IT) .......................................... BO99A0436

(51) Int. Cl.[7] .................................................. E06B 3/12
(52) U.S. Cl. ........................ 160/222; 160/202; 160/220; 160/223
(58) Field of Search ................................ 160/197, 220, 160/221, 222, 223, 224, 219, DIG. 2; 267/85, 109, 139

(56) References Cited

U.S. PATENT DOCUMENTS

| | | | | |
|---|---|---|---|---|
| 3,437,367 A | * | 4/1969 | Blank ........................... | 293/70 |
| 3,565,153 A | * | 2/1971 | Loos ........................... | 160/202 |
| 3,570,578 A | * | 3/1971 | Loos ........................... | 160/202 |
| 3,578,061 A | * | 5/1971 | Hascheck ................... | 160/202 |
| 3,664,653 A | * | 5/1972 | Walker ....................... | 267/139 |
| 3,784,181 A | * | 1/1974 | Nemec ....................... | 267/140 |
| 4,362,148 A | * | 12/1982 | Luebke et al. .............. | 126/369 |
| 4,515,248 A | * | 5/1985 | Ohta ........................... | 187/67 |
| 4,583,716 A | * | 4/1986 | Stephens et al. ........... | 256/13.1 |
| 4,881,891 A | * | 11/1989 | Luther ........................ | 425/556 |
| 4,962,916 A | * | 10/1990 | Palinkas ..................... | 267/153 |
| 4,997,171 A | * | 3/1991 | Toms, Jr. .................... | 267/294 |
| 5,199,926 A | * | 4/1993 | Henning et al. ........ | 160/222 X |
| 5,224,689 A | * | 7/1993 | Georgiev .................... | 267/225 |
| 5,443,146 A | * | 8/1995 | Ayyildiz et al. ............ | 188/374 |
| 5,884,684 A | * | 3/1999 | Jefferson ................ | 160/222 X |
| 6,082,716 A | * | 7/2000 | Tabellini .................... | 267/139 |
| 6,116,830 A | * | 9/2000 | Azema .................. | 160/222 X |
| 6,193,460 B1 | * | 2/2001 | Damico ...................... | 414/494 |

FOREIGN PATENT DOCUMENTS

| | | |
|---|---|---|
| DE | 7137781 | 11/1972 |
| EP | 290822 | 11/1988 |
| IT | 1286248 | 10/1998 |

* cited by examiner

Primary Examiner—Bruce A. Lev
(74) Attorney, Agent, or Firm—Fay, Sharpe, Fagan, Minnich & McKee, LLP (57) ABSTRACT

A device for damping movement of a telescopic guard including a plurality of box-shaped cover elements which slide inside each other in a defined direction. A plurality of leaf springs respectively connect the rear edges of the box-shaped elements to the rear edges of adjacent box-shaped elements. A guide rod is connected to each box-shaped element and is slidably connected to the adjacent box-shaped element. The guide rod slides in a friction element attached to an adjacent box-shaped element. Two circular bellows are fitted around the rod.

21 Claims, 13 Drawing Sheets

DEVICE FOR DAMPING MOVEMENT OF TELESCOPIC GUARDS

BACKGROUND OF THE INVENTION

The present invention relates to a device for driving and damping telescopic guards of the type consisting of a plurality of box-shaped elements.

Guards of this kind are used mainly to protect the slideways of automatic machines, machine tools and robotized system by preventing dirt, chippings, swarf and machining emulsions from getting into and clogging up the contact areas of the slideways.

The latest machines run at increasingly higher speeds and it is therefore becoming more and more important to keep the slideways clean and in perfect working order at all times.

The box-shaped elements are fitted with scrapers, usually, made of an elastomer or plastic material. These scrapers, besides keeping dirt and other foreign matter out of the gaps between adjacent box-shaped elements, also permit the achievement of a satisfactory seal.

Since the guard is connected to the moving part of the machine, the box-shaped elements extend and retract at the same speed as that at which the machine moves. This speed can be very high and considering their size and weight, the box-shaped elements, when they reach the fully extended position, knock against each other with considerable force. Such shocks must obviously be avoided not only because of the wear and eventual damage they cause to the guard but also to prevent counterblows on the moving machine parts and, last but not least, to reduce noise.

It is therefore essential to provide damping devices between the box-shaped elements.

A damping device designed for this purpose is described in utility model patent publication DE-U-7137781. In this publication, the damping device is made by simply applying to the back of the scraper, where it comes into contact with the smaller, adjacent box-shaped element a strip of synthetic cellular material. Another type of damping device for the box-shaped elements of a telescopic guard made from a strip of material different from that of the scraper is described in patent publication EP-B-290822.

However, with damping devices of this kind, shocks are still possible on account of the high speeds reached by the moving machine parts, the weight of the boxshaped elements and the limited deformability of the strips of synthetic material.

Moreover, when the guards reach the fully extended position, the box-shaped elements stop, passing from a very high speed to zero speed in a very short space of time. They are therefore subjected to a high deceleration rate which can have negative effects on the moving machine parts.

Italian patent No. 012862248, in the name of the same Applicant as the present, describes a damping device equipped with deformable, elastic arms designed to damp the impact between two adjacent box-shaped elements when these are being extended.

Mechanical devices designed to simultaneously open all the box-shaped elements making up the telescopic guards have also been made in an attempt partly solve the problem of shocks. These devices consist either of a series of chains acting on hooking elements located in each single box-shaped element or complex telescopic joints located in the box-shaped elements themselves.

SUMMARY OF THE INVENTION

The principal aim of the present invention is to overcome the disadvantages of prior art through a new device for driving and damping the box-shaped elements of telescopic guides that is capable of simultaneously driving all the box-shaped elements while providing a gradual and effective damping action and that is simple and economical to make.

BRIEF DESCRIPTION OF THE DRAWINGS

The technical features of the present invention, in accordance with the above mentioned aims, are set out in the claims herein and the advantages more clearly illustrated in the detailed description which follows, with reference to the accompanying drawings, which illustrate preferred embodiments of the invention without restricting the scope of the inventive concept and in which:

DESCRIPTION OF THE PREFERRED EMBODIMENTS

With reference to the accompanying drawings, the numeral 20 indicates as a whole a device for driving and damping a telescopic guard, labeled 1 as a whole, used to protect the slideways of automatic machines, machine tools and robotized systems, of known type and therefore not illustrated.

Figure 1:
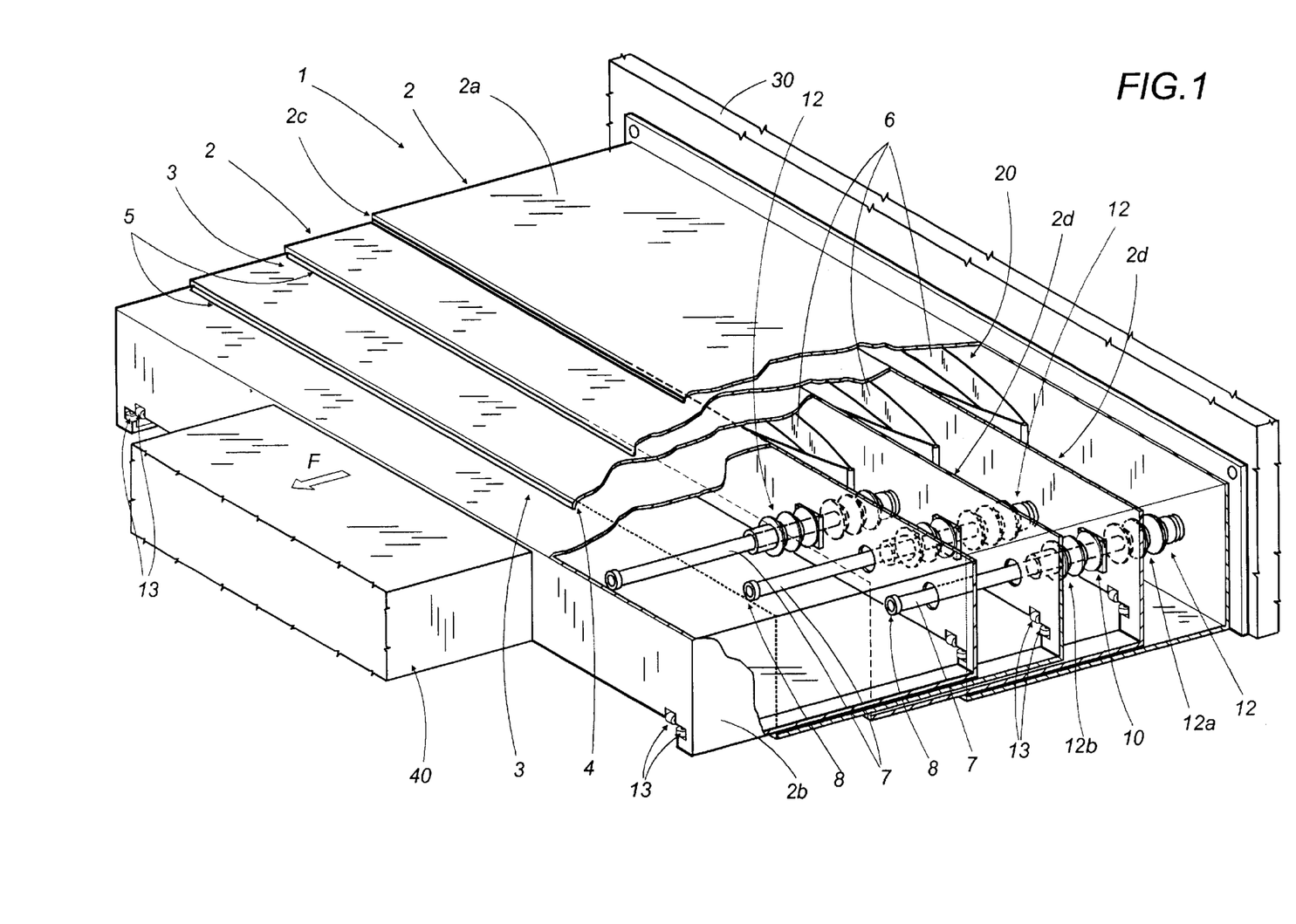
FIG. 1 is a perspective view from above, with some parts cut away, of a telescopic guard equipped with the device disclosed by the present invention.

As shown in FIG. 1, the telescopic guard, comprising a plurality of box-shaped elements 2, is attached at one end to a fixed part 30 of the machine and, at the other end, to a moving part 40 of the machine, and can be extended or retracted in the direction of the arrow F.

For clarity, some parts of the telescopic guard 1 and of the device 20 have been cut away and others are illustrated as transparent.

The box-shaped elements 2 making up the guard are of known type made, for example, of steel, and usually have at least one horizontal wall 2a, two vertical walls 2b, a front edge 2c and a rear edge 2d.

With the exception of the box-shaped elements 2 at the ends of the telescopic guard 1, each element 2 borders on two other box-shaped elements, one larger and the other smaller than it. The elements 2 slide inside one another in telescopic fashion in a direction F, moving between a first position in which the guard 1 is closed or fully retracted, to a second position in which the guard 1 is open or fully extended. These end positions of the telescopic guard 1 correspond to the end positions of the machine which the guard 1 is fitted to.

Close to the rear edge 2d of each box-shaped element 2, there is a scraping device 3 comprising a section 4 and a scraping element 5, both of known type.

Figure 2:
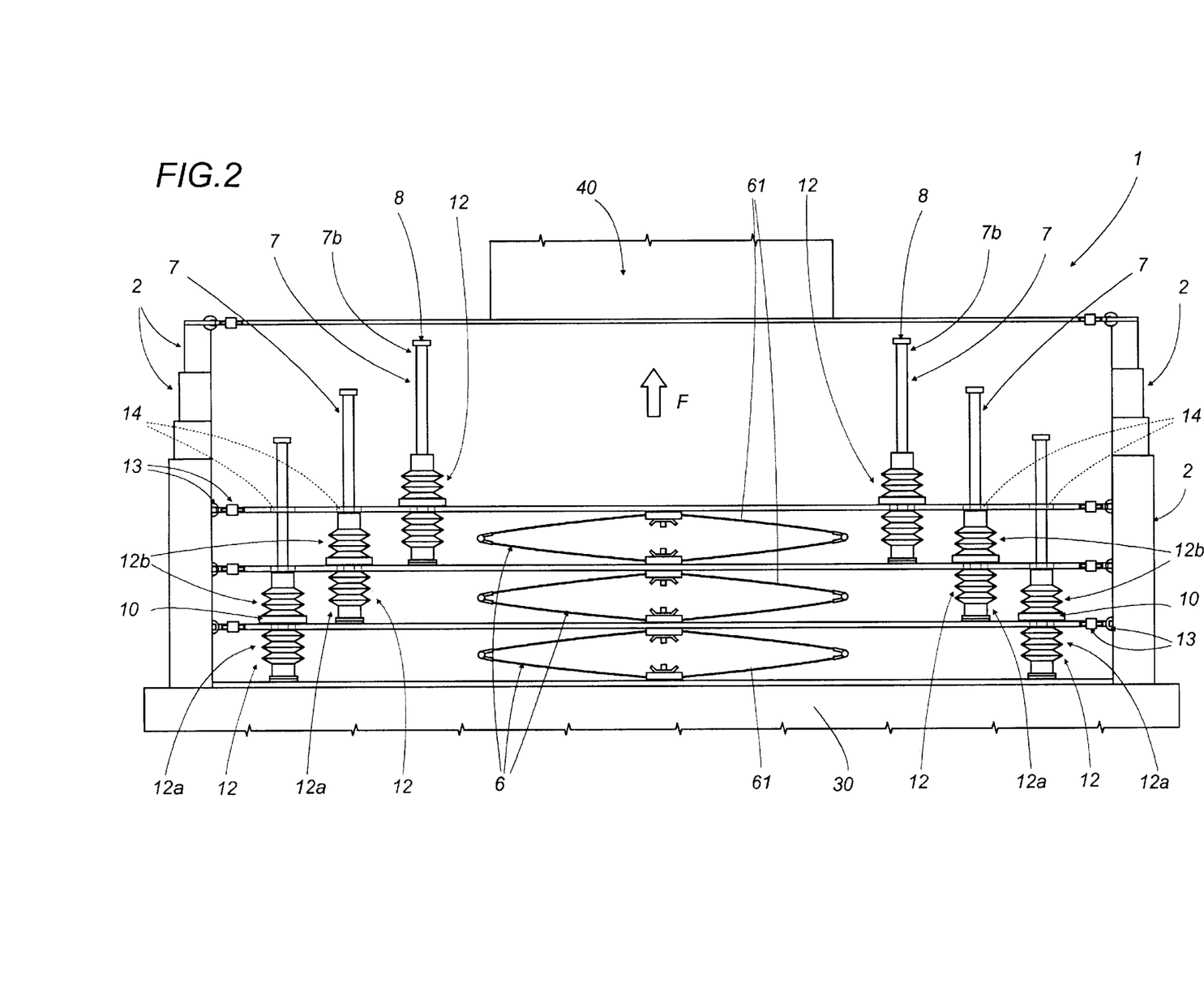
FIG. 2 is a view from below of the telescopic guard illustrated in FIG. 1, in a closed configuration.
Figure 3:
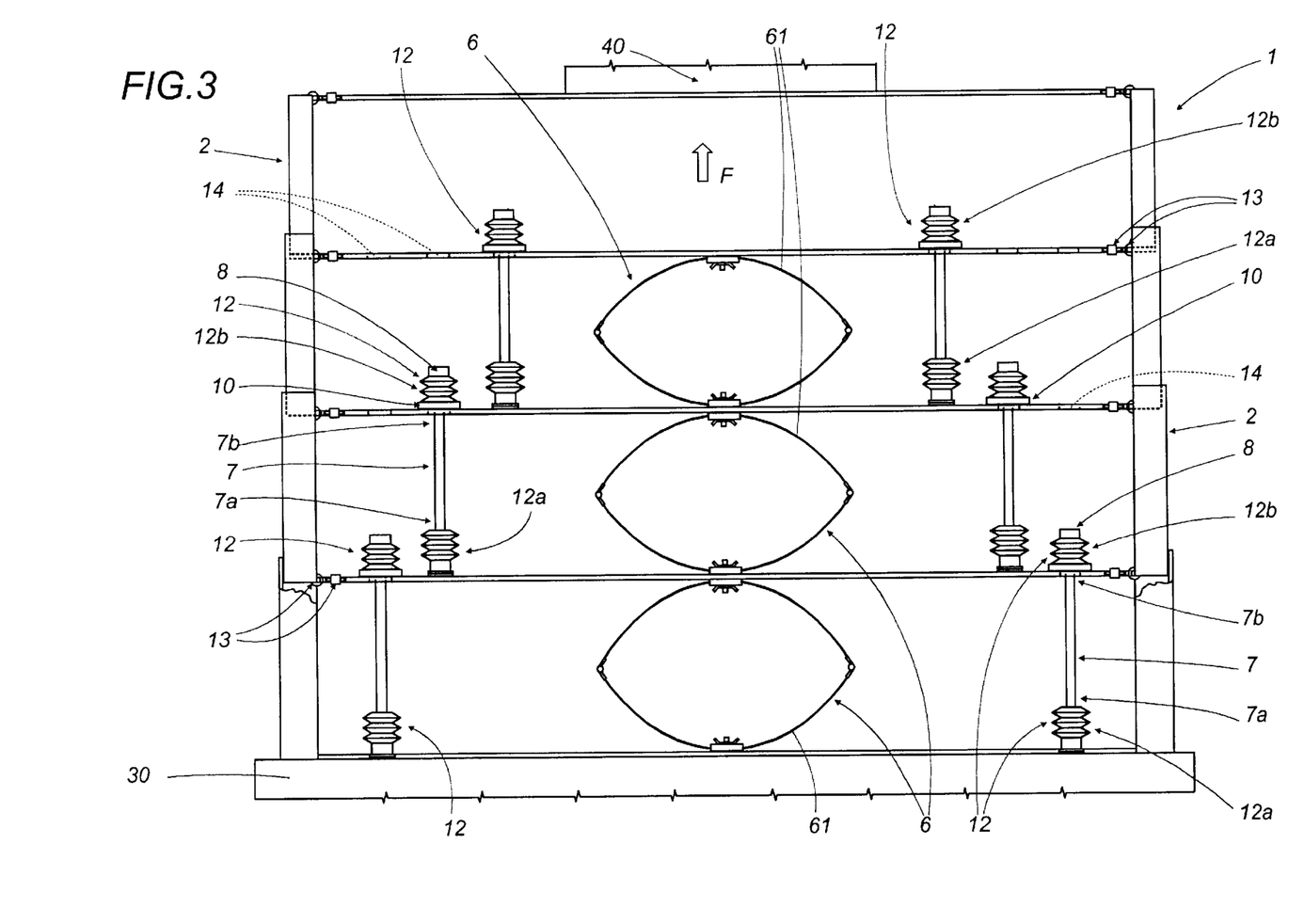
FIG. 3 is a view from below of the telescopic guard illustrated in FIG. 1, in an open configuration.

With reference to the accompanying drawings, each box-shaped element 2 is connected to the box-shaped element 2 adjacent to it by an elastic element, labeled 6 as a whole, fitted close to the rear edge 2d of each box-shaped element 2. In particular, as shown in FIGS. 1, 2 and 3, the elastic elements 6 consist of leaf springs 61.

Again with reference to FIGS. 1, 2 and 3, two guide rods 7 connect each box-shaped element 2 to the box-shaped element 2 adjacent to it. A first end 7a of each rod 7 is rigidly connected to a box-shaped element 2, while a second end 7b has a stop surface 8. The latter is made in such a way that it engages with the smaller adjacent box-shaped element 2 to determine a fully extended position of the two box-shaped elements 2 relative to each other.

During the relative movement of two adjacent box-shaped elements 2, the rod 7 that is integral with the larger of the two box-shaped elements 2 slides into a supporting bush 9 fixed to the rear edge 2d of the smaller of the two box-shaped elements 2.

Inside it, the bush 9 has a friction element 10 consisting, for example, of a part 11 made of synthetic or natural rubber or of another material with a high abrasion resistance.

Each rod 7 is provided with damping means 12. In the embodiment illustrated, these damping means comprise a first circular bellows 12a fitted round the rod 7 close to its first end 7a and a second circular bellows 12b fitted close to the second end 7b of the rod 7.

The circular bellows 12a and 12b are made of synthetic material and are fitted in such a way that they can slide freely along part of the rod 7, on opposite sides of the rear edge 2d of the box-shaped element 2 crossed by the rod 7.

The rods 7 of the different box-shaped elements 2 are offset from each other crossways so as not to interfere with each other during the opening and closing movements of the guard 1.

Each box-shaped element 2 is equipped with rolling-contact bearings 13 fitted on the edge 2d, close to the ends of the edge 2d itself, which are designed to support the telescopic guard 1 and enable it to run on the slideways of the machine, which are not illustrated.

The rear edge 2d of each box-shaped element 2 also has a plurality of holes 14 allowing the passage of the rods 7 of the box-shaped elements 2 larger than it so that the size of the telescopic guard 1 when it is fully retracted, that is to say, closed, is not determined by the length of the rods 7 but by the space occupied by the leaf springs 61 lengthways when they are flat against each other.

Figure 7:
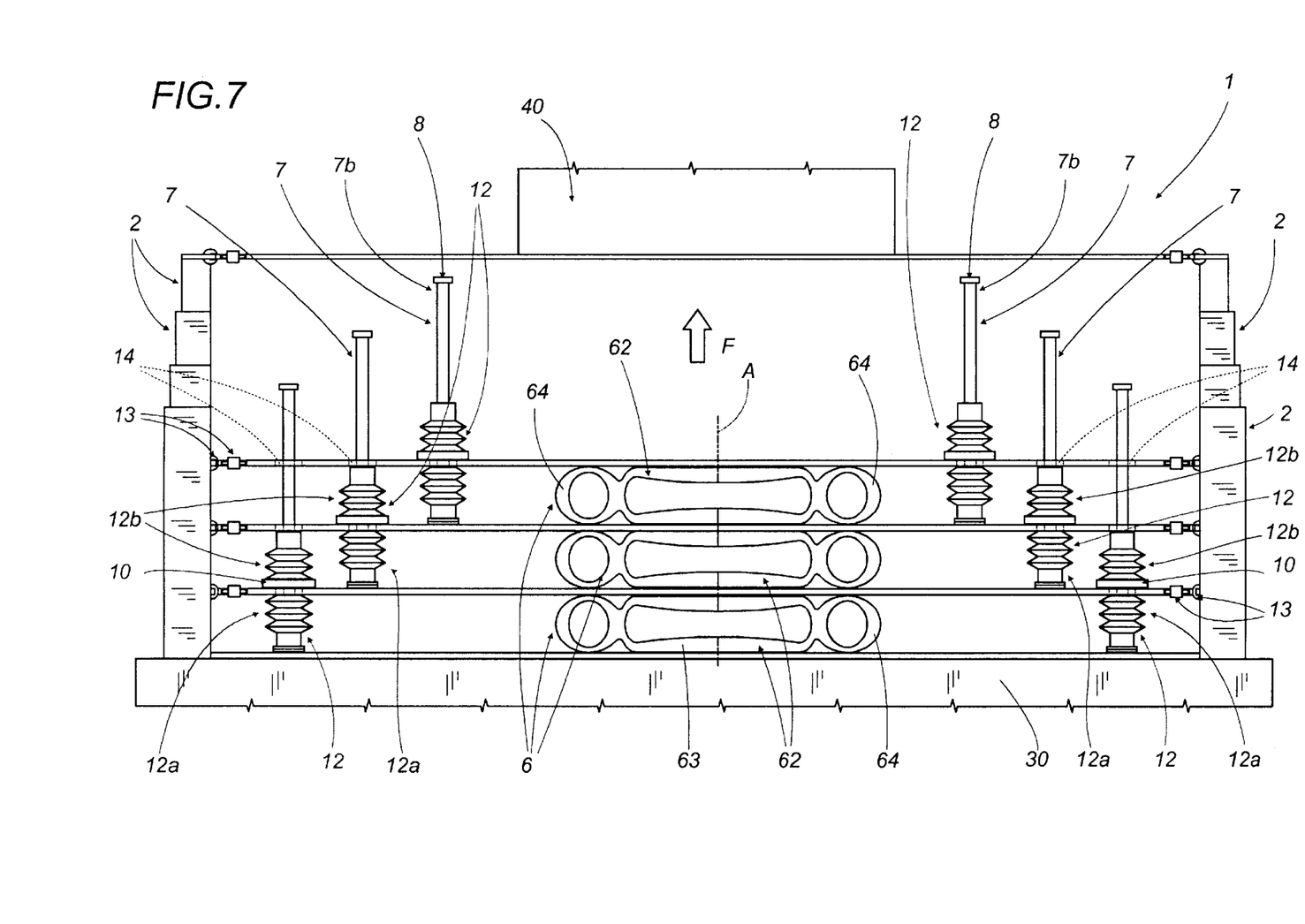
FIGS. 7 and 8 are bottom views of another embodiment of the telescopic guard illustrated in FIG. 1, shown in the closed configuration and in the open configuration, respectively.
Figure 8:
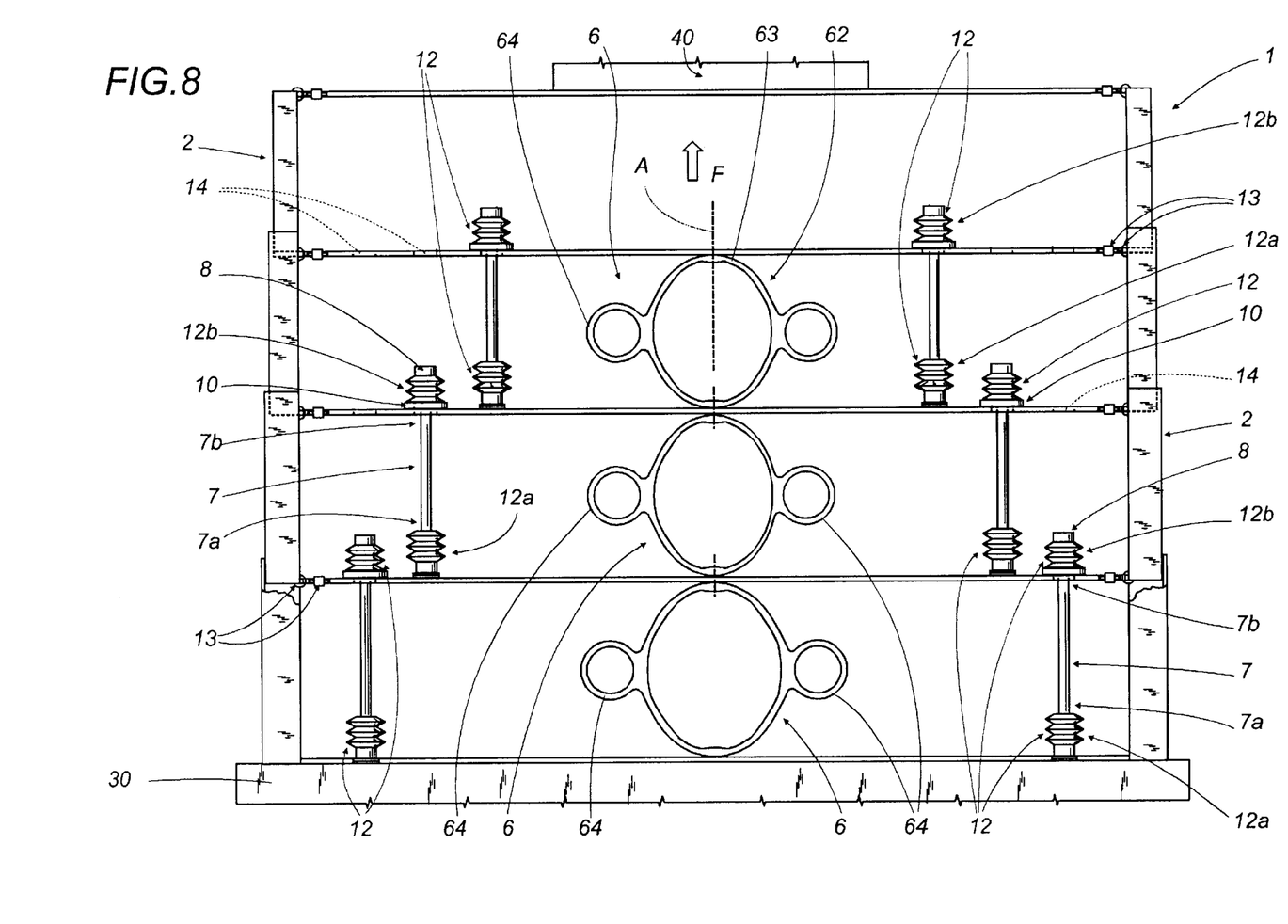

In the embodiment illustrated in FIGS. 7 and 8, the elastic element 6 that connects the adjacent boxshaped elements 2 consists of a plastic spring 62 comprising a main body 63 made and designed to operate, at least during the opening of the box-shaped elements 2, like a pair of ordinary leaf springs positioned with their concave portions facing each other, and two eyes 64 forming an integral part of the body 63 and extending from both ends of the body 63 on opposite sides of an axis of symmetry A of the body 63 itself parallel to the above mentioned direction F. The eyes 64 constitute shock absorbing elements that come into operation by compression when the box-shaped elements 2 of the guard 1 are retracted.

Figure 9:
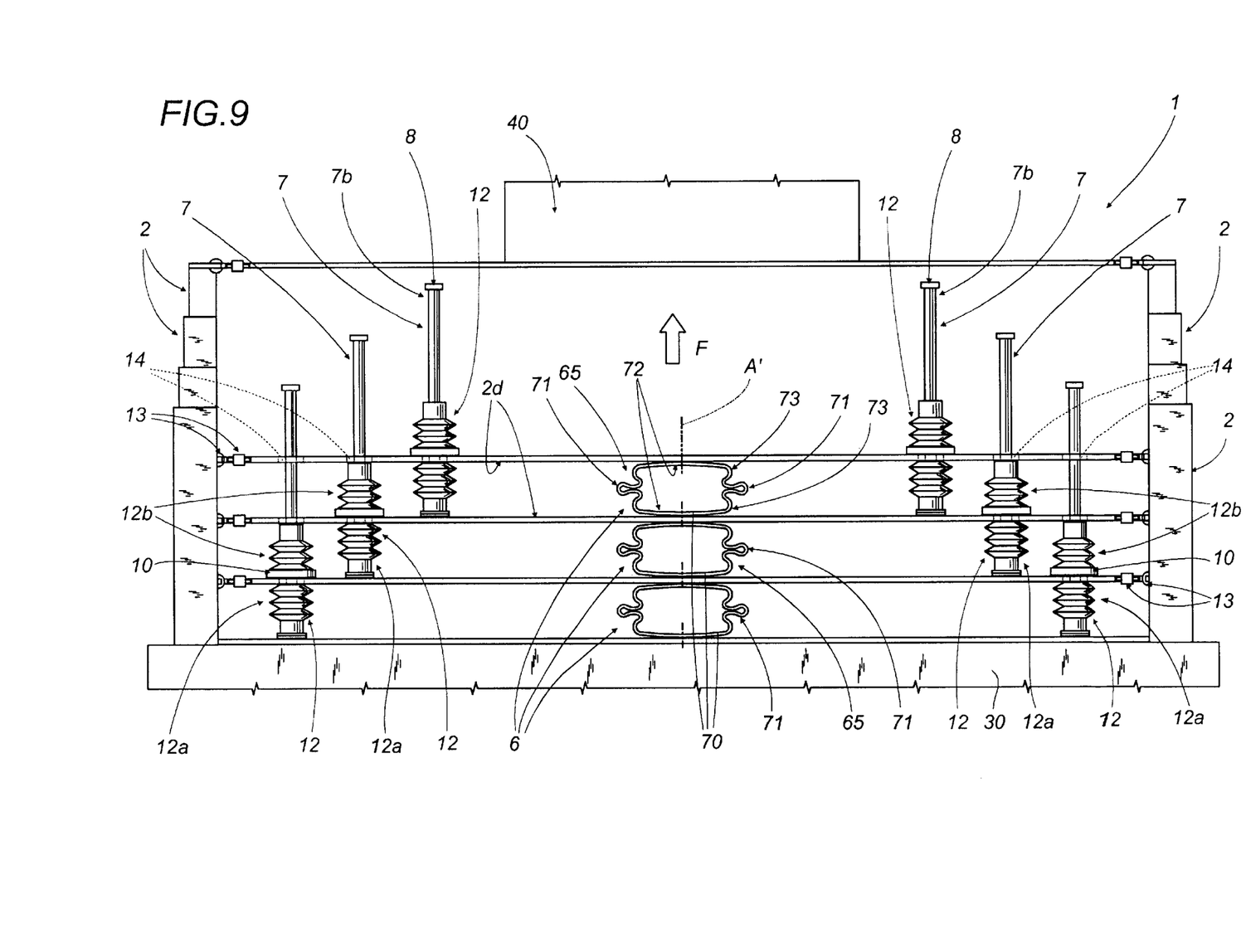
FIGS. 9 and 10 are bottom views of another embodiment of the telescopic guard illustrated in FIG. 1, shown in the closed configuration and in the open configuration, respectively.
Figure 10:
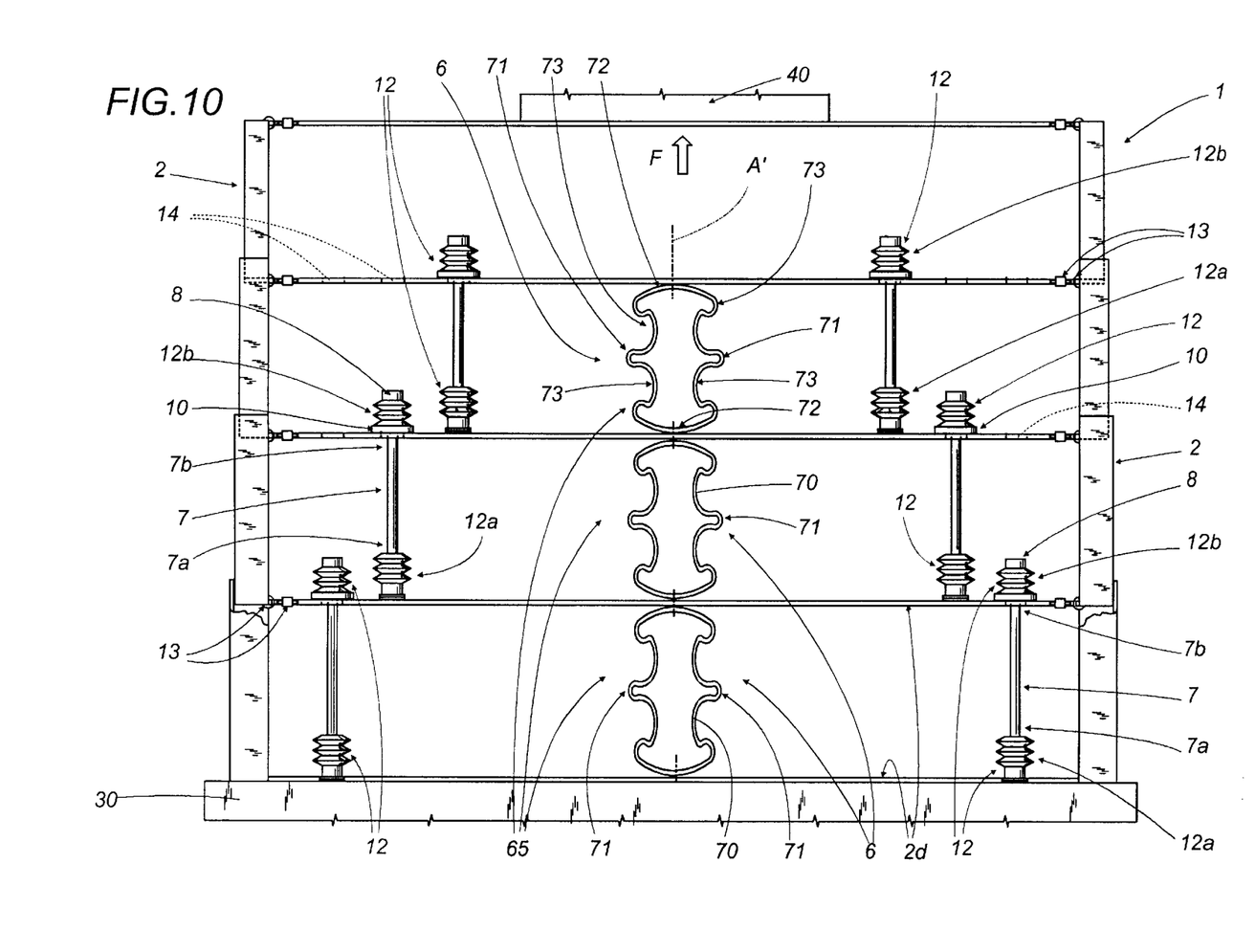
Figure 15:
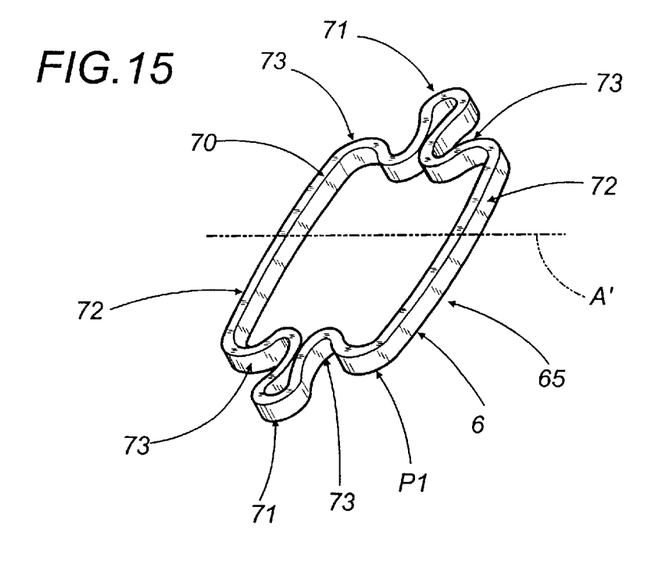
FIG. 15 is a perspective view from above of a detail of the device illustrated in FIGS. 9 and 10.

In the embodiment shown in FIGS. 9 and 10, the elastic connecting element 6, illustrated in more detail in FIG. 15, consists of an annular spring 65 formed by a substantially rectangular plastic section 70, with a continuous preformed profile P1 and an axis of symmetry A', and consisting of two semicircular portions 71 with convexity facing the inside of the profile P1 and positioned on opposite sides of the axis of symmetry A', and two substantially straight portions 72, positioned across the above mentioned axis of symmetry A', and designed to be attached to the rear edges 2d of two adjacent box-shaped elements 2. The semicircular portions 71 are joined to the respective straight portions 72 by portions 73 curved in the shape of an S with concavities alternately facing the inside and outside of the annular spring 65 itself.

Figure 11:
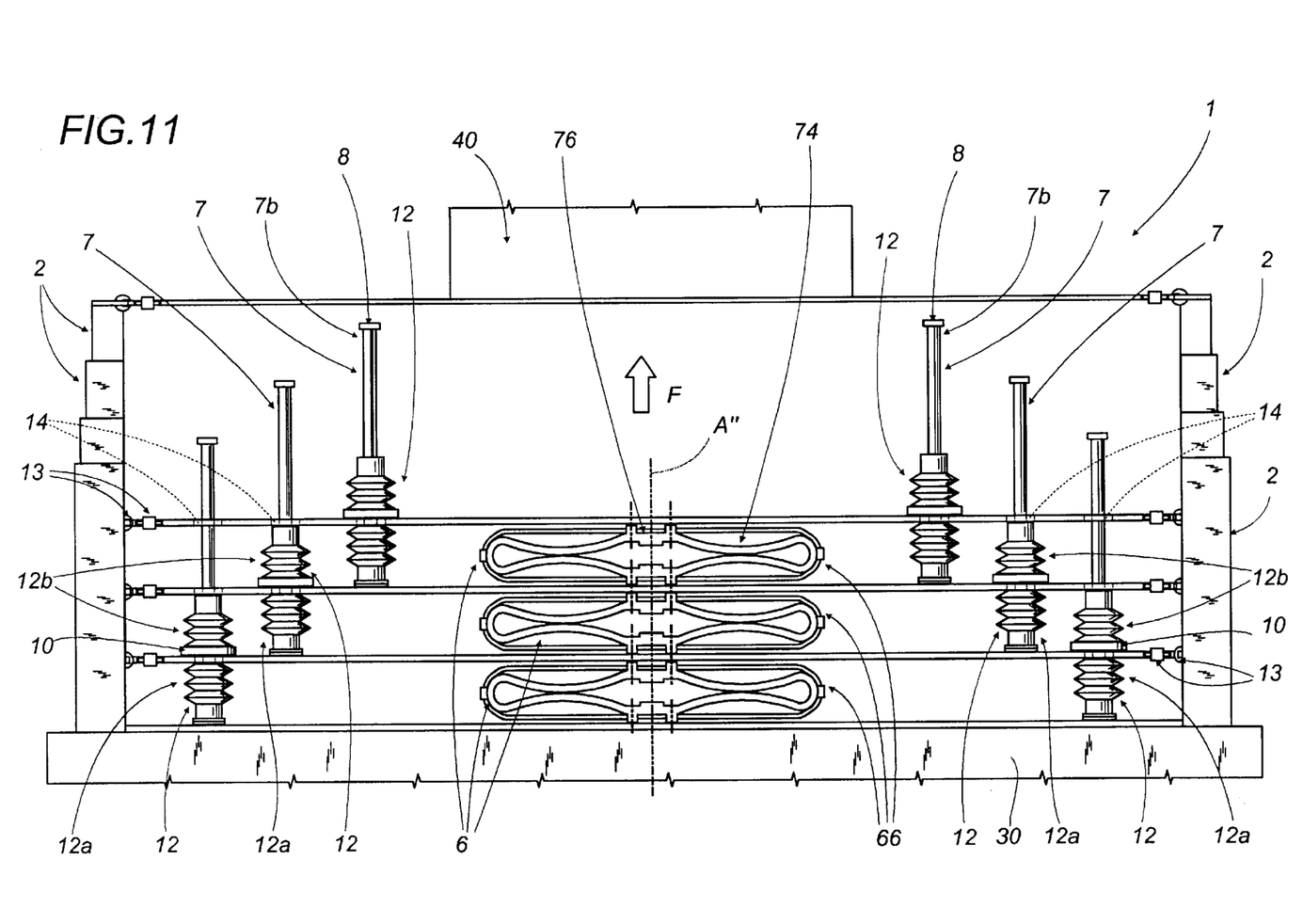
FIGS. 11 and 12 are bottom views of another embodiment of the telescopic guard illustrated in FIG. 1, shown in the closed configuration and in the open configuration, respectively.
Figure 12:
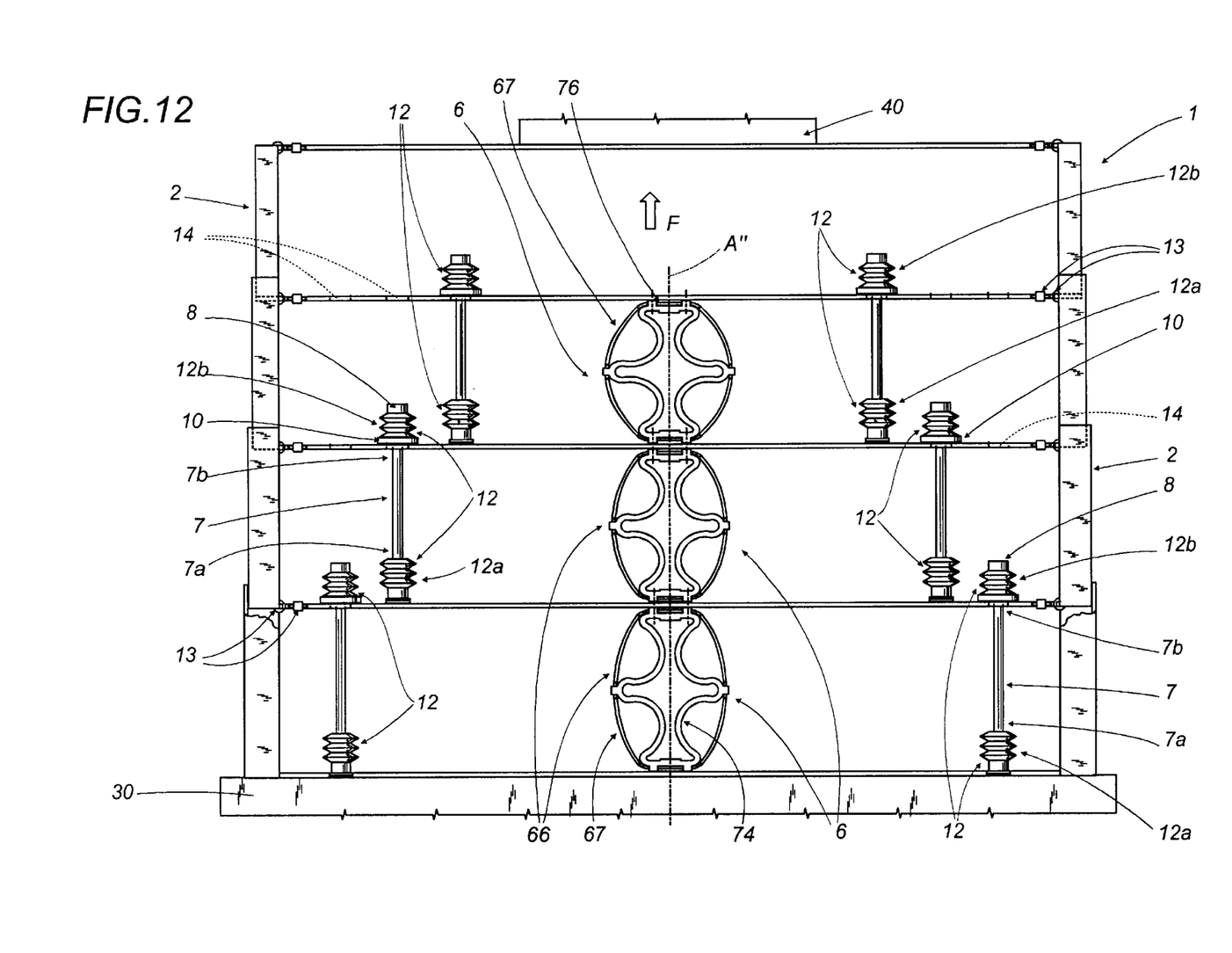
Figure 16:
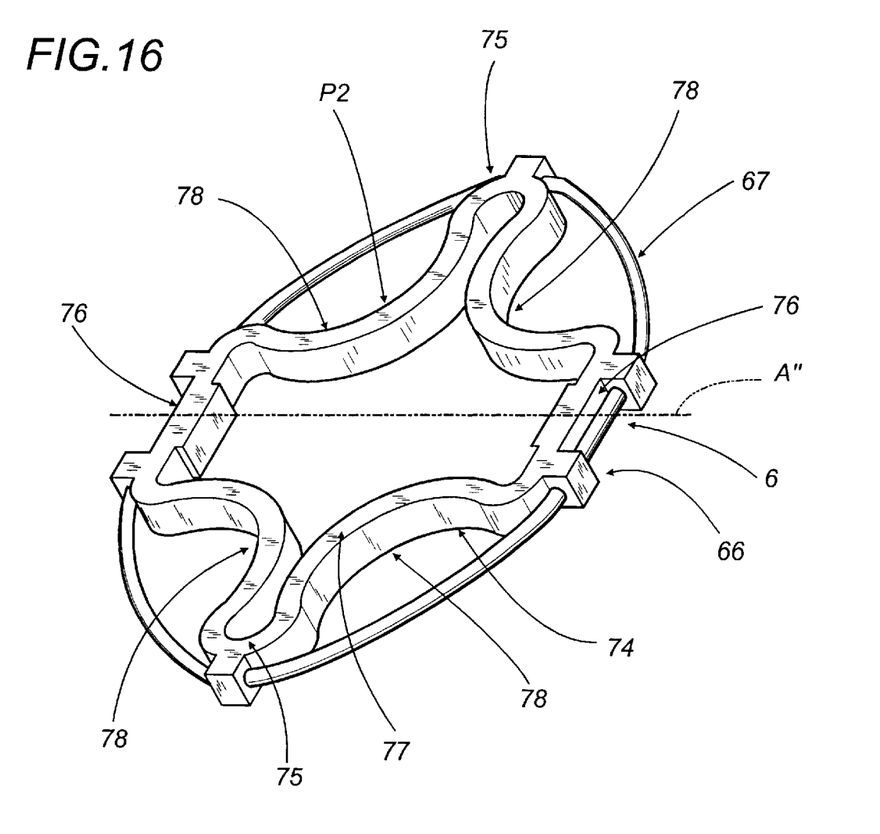
FIG. 16 is a perspective view from above of a detail of the device illustrated in FIGS. 11 and 12.

In the embodiment shown in FIGS. 11 and 12, each of the elastic elements 6 connecting adjacent box-shaped elements 2, illustrated in more detail in FIG. 16, consists of a composite spring 66 made by assembling an annular spring 74 similar to the one described above, labeled 65 in FIGS. 9, 10 and 15, and a helical metal spring 67 closed in a loop round the annular spring 74 itself and forming a boundary P2 whose shape varies according to the movements of the box-shaped elements 2 relative to each other and inside which the annular spring 74 is inscribed. Looking in more detail, the annular spring 74 is formed by a substantially rectangular plastic section 77, with a continuous preformed profile P2 and an axis of symmetry A", and consisting of two semicircular portions 75 with convexity facing the inside of the profile P2 and positioned on opposite sides of the axis of symmetry A", and two substantially straight portions 76, which are shorter than the above mentioned straight portions 72 of the spring 65, said portions 76 being positioned opposite each other across the above mentioned axis of symmetry A", and designed to be attached to the rear edges 2d of two adjacent box-shaped elements 2. The semicircular portions 75 are joined to the respective straight portions 76 by portions 78 curved in the shape of a C with concavity facing the outside of the annular spring 74 itself.

The helical spring 67 and the plastic spring 65, together forming the composite spring 66 are joined together at two or more points in such a way that their actions are combined during the movements of the boxshaped elements 2 relative to each other. These connecting points consist of blocks extending from the outer surface of the annular spring and each having a hole in it through which the helical spring 67 can pass.

Figure 13:
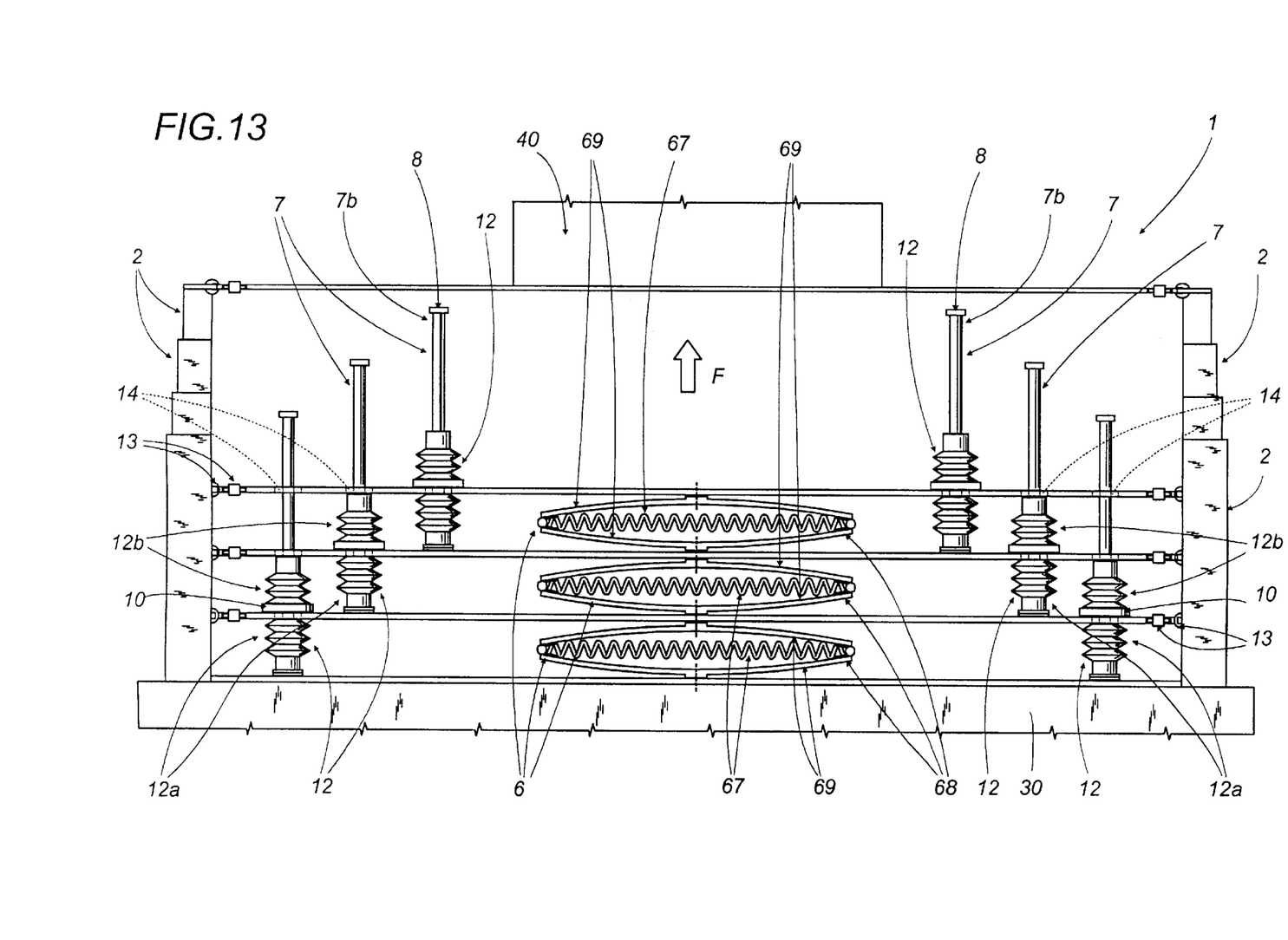
FIGS. 13 and 14 are bottom views of yet another embodiment of the telescopic guard illustrated in FIG. 1, shown in the closed configuration and in the open configuration, respectively.
Figure 14:
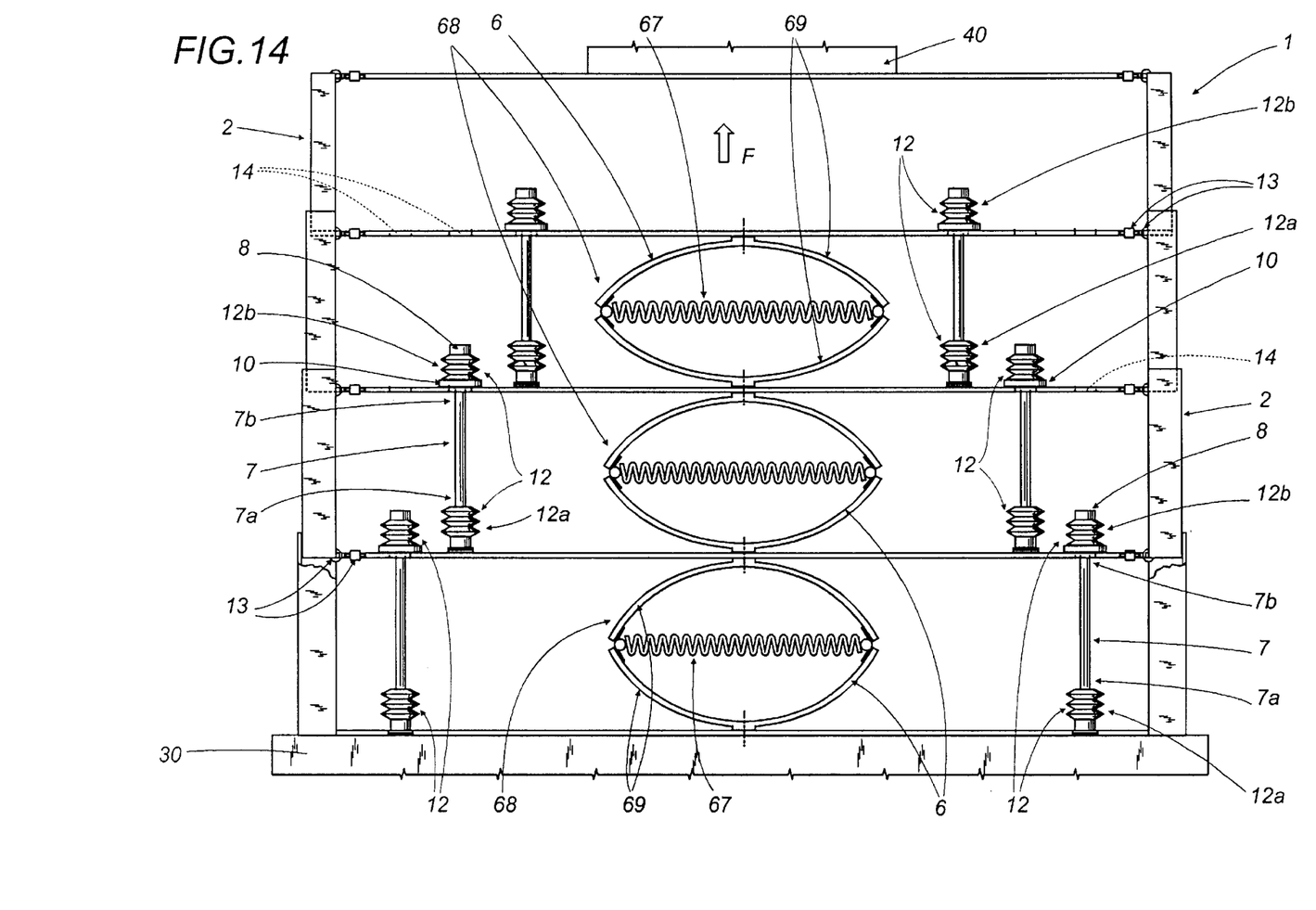

In the embodiment shown in FIGS. 13 and 14, the elastic connecting elements 6 consist of leaf springs 68, each comprising two curved arms 69 whose concave portions face each other and which are hinged to each other at each end, the ends of the arms 69 being connected by a helical spring 67 providing additional spring action during the movements of the box-shaped elements 2 relative to each other.

In the present description, reference is made to generic elastic elements 6 unless one or more of the embodiments of the elements described above, labeled 61, 62, 65, 66 and 68, is being specifically described.

During use, let us assume that the telescopic guard 1 starts from the position illustrated in FIG. 2, 7, 9 or 11 referred to above as the fully retracted or closed position of the guard 1.

As shown in these figures, the box-shaped elements 2 are retracted and almost entirely nested inside each other. The box-shaped elements 2 slide relative to each other on appropriate shoes (not illustrated).

In this closed position, the elastic elements 6 are at least partly compressed so that when the moving part 40 of the automatic machine, machine tool or robotized system starts moving, the box-shaped element 2 to which the moving part 40 is connected is dragged along with it and the telescopic guard 1 thus starts opening, the opening action being facilitated also by the simultaneous extension of the elastic elements 6. The elastic elements 6 cause all the box-shaped elements 2 to which they are connected to be simultaneously extended in the direction of the arrow F.

Figure 4:
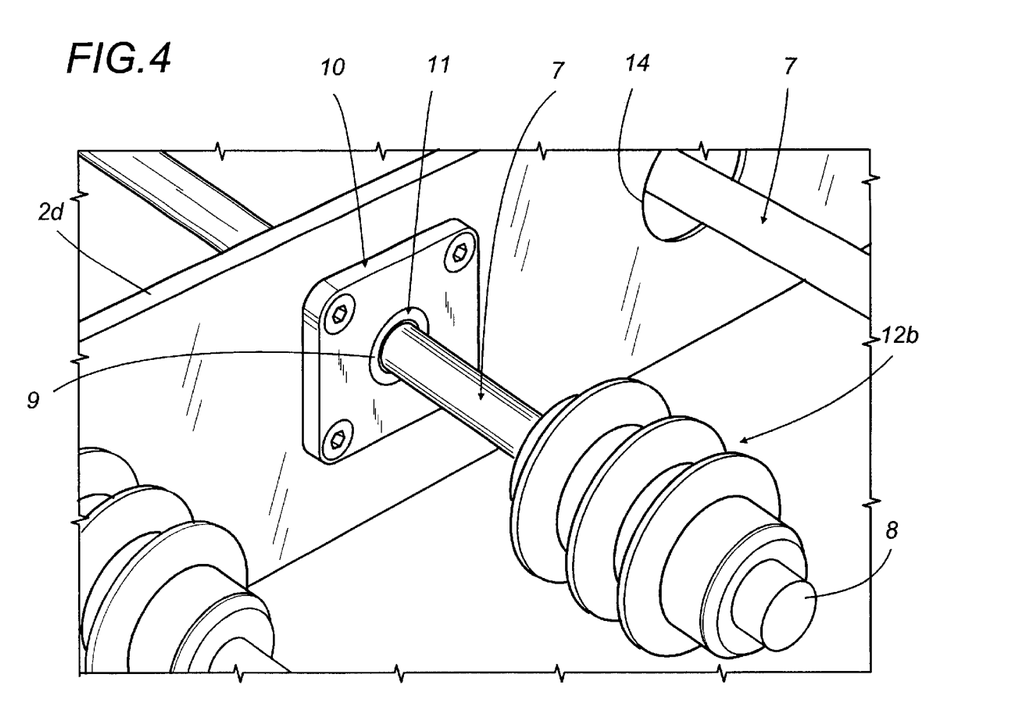
FIG. 4 is a perspective view from above of a detail of the device illustrated in FIG. 1.

Besides this opening action, the simultaneous extension of the box-shaped elements 2 is also facilitated by the combined action of the rods 7 and the friction elements 10 fitted inside the bushes 9. The sliding friction caused by the contact between the surface of the rubber part 11 of the friction element 10 and the surface of the rod 7 as the rod 7 slides inside the corresponding bush 9 (see FIG. 4) creates a driving action on the friction element 10 and on the bush 9 to which it is attached. This driving action is transmitted by the bush 9 to the box-shaped element 2 to which it is attached and thus helps to pull the boxshaped element 2 out of the element adjacent to it.

FIG. 3 illustrates four box-shaped elements 2 in an almost fully extended position.

For each rod 7, the circular bellows 12b placed between the stop surface 8 and the bush 9 provides an effective damping action thanks not only to the compression of the air inside it but also to the shape of the bellows 12b and the material it is made of. Therefore, when the telescopic guard 1 is extended, the box-shaped elements 2 are prevented from knocking against each other.

In the almost fully extended condition, each of the elastic elements 6 is stretched and thus has a certain amount of accumulated elastic potential energy. This elastic energy is returned by the elastic elements 6 to the box-shaped elements 2 from the moment the guard starts retracting again following the motion of the moving part 40 of the machine. The return action exerted by the elastic elements 6 during the reclosing movement tends to move the box-shaped elements 2 towards each other again.

As they return to the closed position illustrated in FIG. 2, 8, 10, 12 and 14, the box-shaped elements 2 transmit to the rods, again through the friction element 10, a pushing action similar to the extending action received by the rods 7 during the opening movement.

The circular bellows 12a fitted close to the area where each rod 7 is attached to the corresponding boxshaped element 2 is compressed between the two rear edges 2d of two adjacent box-shaped elements 2 moving towards each other when the telescopic guard 1 is retracting. The resulting action is similar to that described above that occurs when the telescopic guard 1 is being extended.

The compression of the bellows 12a provides an effective damping action which prevents the box-shaped elements 2 from knocking against each other. The elastic elements 6 contribute to the damping action by compressing and thus absorbing, in the form of elastic potential energy, part of the kinetic energy possessed by the box-shaped elements 2 as they move towards each other, accumulating this energy so that it can be used later, when the telescopic guard 1 next opens.

From the above description, it is clear that during operation of the telescopic guard 1, the damping function is the result of a combination of different factors.

The damping capability of the device is much higher than that of known devices of this kind. The damping action is developed gradually and effectively over a relatively long stroke.

Figure 6:
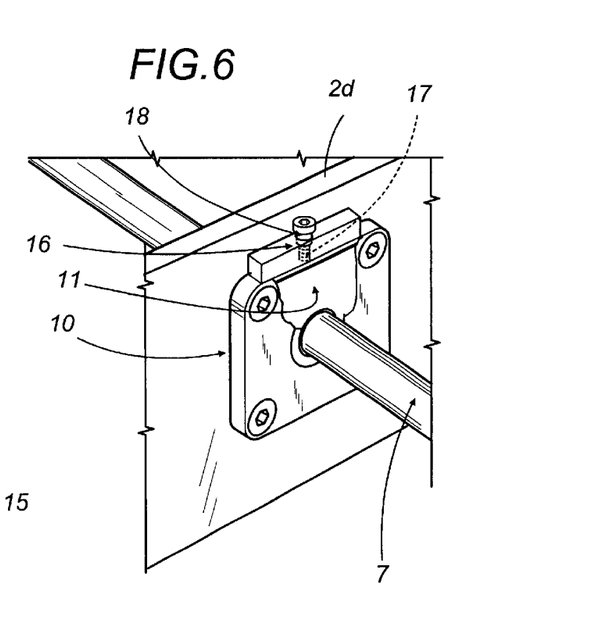
FIG. 6 is a schematic perspective view of a detail from FIG. 4.

In another embodiment of the device, illustrated in FIG. 6, the friction element 10 comprises a pressure element 16, actuated by a spring 17 and acting on the part 11 in such a way as to push it against the rod 7. The contact pressure between the part 11 and the surface of the rod 7 generates a friction component which opposes the relative motion between the rod 7 itself and the different parts attached to the friction element 10. The contact pressure between the part 11 and the rod can be adjusted using a screw 18 which controls the thrust force of the spring 17.

It should be noted that the friction element 10 acting on the rods 7 has a stabilizing effect on the telescopic guard 1, thus preventing vibrations, at both high and low speeds of the box-shaped elements 2 retracting and extending relative to each other.

Figure 5:
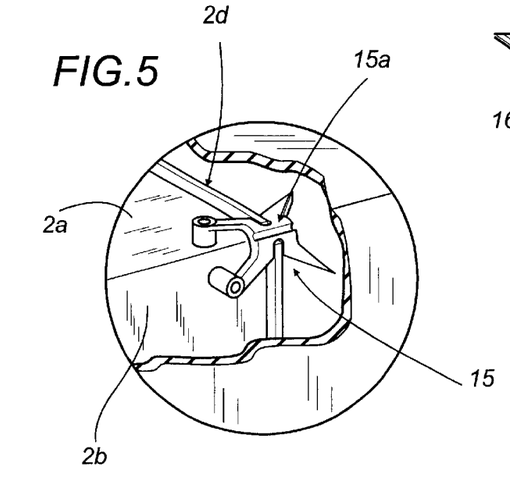
FIG. 5 is a perspective view of the telescopic guard equipped with the damping device made according to another embodiment of the invention illustrated in FIG. 1.

In a preferred embodiment illustrated in FIG. 5, the drive and damping device 20 disclosed by the present invention further comprises a damping element 15 made of plastic and fitted to the rear edge 2d of each boxshaped element 2 at the corner between the horizontal wall 2a and the vertical wall 2b of the element 2. To facilitate the bending of the damping element 15 on said corner, the device 15 has a lightening groove 15a extending lengthways parallel to the side of the guard.

The invention described can be subject to modifications and variations without thereby departing from the scope of the inventive concept. Moreover, all the details of the invention may be substituted by technically equivalent elements.

What is claimed is:

1. In combination with a telescopic guard device comprising a plurality of associated box-shaped cover elements that telescopically slide inside each other along a defined path, a damping device comprising:

a plurality of elastic means which respectively connect each associated box-shaped element to an adjacent smaller associated box-shaped element, said elastic means being fixed to the rear edge of each associated box-shaped element and to the rear edge of the adjacent smaller associated box-shaped element.

2. The device according to claim 1, further comprising a plurality of guide rods that respectively connect each associated box-shaped element to the adjacent smaller box-shaped element.

3. The device according to claim 2, wherein each of said plurality of guide rods has a first end rigidly connected to the associated box-shaped element and a second end that has a stop surface designed to engage with the smaller adjacent associated box-shaped element to determine a fully extended position of the smaller adjacent associated box-shaped element relative to the associated box-shaped element.

4. The device according to claim 3, wherein each of the plurality of guide rods comprises damping means to absorb shocks between the guide rod and the box-shaped elements connected by the guide rod.

5. The device according to claim 3, wherein each adjacent smaller associated box-shaped element comprises at least one friction element engaged with the guide rod that is connected to the adjacent smaller associated box-shaped element.

6. The device according to claim 2, wherein each of the plurality of guide rods comprises damping means to absorb shocks between the guide rod and the box-shaped elements connected by the guide rod.

7. The device according to claim 6, wherein the damping means comprise a first circular bellows made of plastic and fitted around the guide rod at a first end and a second circular bellows fitted around the rod at its second end.

8. The device according to claim 7, wherein each adjacent smaller associated box-shaped element comprises at least one friction element engaged with the guide rod that is connected to the adjacent smaller associated box-shaped element.

9. The device according to claim 6, wherein each adjacent smaller associated box-shaped element comprises at least one friction element engaged with the guide rod that is connected to the adjacent smaller associated box-shaped element.

10. The device according to claim 2, wherein each adjacent smaller associated box-shaped element comprises at least one friction element engaged with the guide rod that is connected to the adjacent smaller associated box-shaped element.

11. The device according to claim 10, wherein the friction element comprises a material with high abrasion resistance which creates sliding resistance between the friction element and the guide rod in contact with the friction element.

12. The device according to claim 10, further comprising pressure means for adjusting a pressure at which said friction element acts on the guide rod in contact with the friction element.

13. The device according to claim 12, wherein the pressure means for adjusting a pressure comprise a spring and means for adjusting a thrust force of the spring on the friction element.

14. The device according to claim 2, wherein the elastic means comprise at least one spring.

15. The device according to claim 1, wherein the elastic means comprise at least one spring.

16. The device according to claim 15, wherein the spring is a leaf spring.

17. The device according to claim 16, wherein the leaf spring comprises two curved arms whose concave portions face each other and which are hinged to each other at each end, the ends of the arms being connected by a helical spring.

18. The device according to claim 15, wherein the spring comprises a main annular body and two eyes forming an integral part of the body and extending from both ends of the body on opposite sides of an axis of symmetry of the body and parallel to the sliding direction.

19. The device according to claim 15, wherein the spring is an annular spring with a continuous preformed profile and an axis of symmetry and consists of two semicircular portions with convexity facing the inside of the profile and positioned on opposite sides of the axis of symmetry, and two substantially straight portions, positioned across the axis of symmetry, said semicircular portions being joined to the respective straight portions by portions curved in the shape of an S with concavities alternatively facing the inside and outside of the annular spring.

20. The device according to claim 15, wherein the spring is a composite spring and comprises an annular spring, with a continuous preformed profile and an axis of symmetry parallel to the sliding direction, and consisting of two semicircular portions with convexity facing the inside of the profile and positioned on opposite sides of the axis of symmetry, and two substantially straight portions positioned across the axis of symmetry, said semicircular portions being joined to the respective straight portions by portions curved in the shape of a C with concavity facing the outside of the annular spring, the composite spring further comprising a helical metal spring forming a boundary inside which the annular spring is inscribed.

21. In combination with a telescopic guard device comprising a plurality of box-shaped cover elements that telescopically slide inside each other along a defined path, a device for interconnecting and damping relative movement of a first box-shaped cover element and an adjacent smaller box-shaped cover element of the telescopic guard device, said device comprising an elastic member having a first portion fixedly secured to the first box-shaped element and a second portion fixedly secured to the second box-shaped element.

* * * * *